US007739629B2

United States Patent
Wang et al.

(10) Patent No.: US 7,739,629 B2
(45) Date of Patent: Jun. 15, 2010

(54) METHOD AND MECHANISM FOR IMPLEMENTING ELECTRONIC DESIGNS HAVING POWER INFORMATION SPECIFICATIONS BACKGROUND

(75) Inventors: Qi Wang, San Jose, CA (US); Ankur Gupta, Mountain View, CA (US); Pinhong Chen, Saratoga, CA (US); Christina Chu, San Jose, CA (US); Manish Pandey, San Jose, CA (US); Huan-Chih Tsai, Saratoga, CA (US); Sandeep Bhatia, San Jose, CA (US); Yonghao Chen, Groton, MA (US); Steven Sharp, Lowell, MA (US); Vivek Chickermane, Ithaca, NY (US); Patrick Gallagher, Appalachian, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 615 days.

(21) Appl. No.: 11/590,657

(22) Filed: Oct. 30, 2006

(65) Prior Publication Data

US 2007/0245285 A1 Oct. 18, 2007

Related U.S. Application Data

(60) Provisional application No. 60/792,060, filed on Apr. 14, 2006.

(51) Int. Cl.
 *G06F 17/50* (2006.01)
(52) U.S. Cl. .................. 716/4; 716/2; 716/7; 703/14
(58) Field of Classification Search .................. 716/2, 716/4, 7; 703/14
 See application file for complete search history.

(56) References Cited

U.S. PATENT DOCUMENTS

| 5,625,803 | A * | 4/1997 | McNelly et al. ............... 703/14 |
|---|---|---|---|
| 6,083,271 | A * | 7/2000 | Morgan ......................... 716/1 |
| 6,195,630 | B1 * | 2/2001 | Mauskar et al. ............... 703/18 |
| 6,480,815 | B1 * | 11/2002 | Olson et al. ................... 703/14 |
| 6,735,744 | B2 * | 5/2004 | Raghunathan et al. ......... 716/4 |
| 6,779,163 | B2 * | 8/2004 | Bednar et al. .................. 716/7 |
| 6,820,240 | B2 * | 11/2004 | Bednar et al. .................. 716/1 |
| 6,883,152 | B2 * | 4/2005 | Bednar et al. .................. 716/5 |
| 6,944,843 | B2 * | 9/2005 | Bansal .......................... 716/16 |
| 7,000,214 | B2 * | 2/2006 | Iadanza et al. ................ 716/18 |
| 7,296,251 | B2 * | 11/2007 | Dhanwada et al. ............. 716/9 |
| 7,305,639 | B2 * | 12/2007 | Floyd et al. .................... 716/5 |
| 2002/0133792 | A1 * | 9/2002 | Raghunathan et al. ......... 716/4 |
| 2004/0060024 | A1 * | 3/2004 | Bednar et al. .................. 716/7 |
| 2004/0083441 | A1 * | 4/2004 | Gweon et al. ................. 716/12 |

(Continued)

OTHER PUBLICATIONS

Potlapally et al., "Accurate Power Macro-Modeling Techniques for Complex RTL Circuits", Fourteenth International Conference on VLSI Design, Jan. 3, 2001, pp. 235-241.*

*Primary Examiner*—Phallaka Kik
(74) *Attorney, Agent, or Firm*—Stephen C. Durant

(57) ABSTRACT

A method of adding power control circuitry to a circuit design at each of an RTL and a netlist level comprising: demarcating multiple power domains within the circuit design; specifying multiple power modes each power mode corresponding to a different combination of on/off states of the multiple demarcated power domains; and defining isolation behavior relative to respective power domains.

29 Claims, 10 Drawing Sheets

U.S. PATENT DOCUMENTS

| | | | |
|---|---|---|---|
| 2004/0243958 A1* | 12/2004 | Bednar et al. | 716/7 |
| 2005/0034095 A1* | 2/2005 | Bansal | 716/18 |
| 2005/0108667 A1* | 5/2005 | Iadanza et al. | 716/4 |
| 2005/0278676 A1* | 12/2005 | Dhanwada et al. | 716/9 |
| 2006/0031795 A1* | 2/2006 | Rahmat et al. | 716/5 |
| 2006/0117282 A1* | 6/2006 | Frenkil | 716/5 |
| 2006/0184905 A1* | 8/2006 | Floyd et al. | 716/5 |
| 2006/0265681 A1* | 11/2006 | Bakir et al. | 716/10 |
| 2007/0245277 A1* | 10/2007 | Chen | 716/5 |
| 2007/0245278 A1* | 10/2007 | Chen | 716/5 |
| 2008/0052654 A1* | 2/2008 | Rahmat et al. | 716/6 |
| 2008/0263490 A1* | 10/2008 | Lewis et al. | 716/6 |
| 2008/0270962 A1* | 10/2008 | Chadwick et al. | 716/6 |
| 2009/0125851 A1* | 5/2009 | Levy | 716/1 |

* cited by examiner

Table 1-1 Static Behavior

| Power Domain | Power Mode | | | |
| --- | --- | --- | --- | --- |
| | PM1 | PM2 | PM3 | PM4 |
| PD1 | ON | ON | ON | ON |
| PD2 | ON | OFF | OFF | ON |
| PD3 | ON | ON | OFF | OFF |

Fig. 8

METHOD AND MECHANISM FOR IMPLEMENTING ELECTRONIC DESIGNS HAVING POWER INFORMATION SPECIFICATIONS BACKGROUND

CROSS REFERENCE TO RELATED APPLICATIONS

This patent application claims priority to U.S. Provisional Patent Application Ser. No. 60/792,060, filed Apr. 14, 2006, which is expressly incorporated herein by this reference.

The following commonly owned patent applications as follows were filed on the dates indicated: U.S. Ser. No. 11/447,683 filed Jun. 5, 2006 entitled OPTIMIZED MAPPING OF AN INTEGRATED CIRCUIT DESIGN TO MULTIPLE CELL LIBRARIES DURING A SINGLE SYNTHESIS PASS, now U.S. Pat. No. 7,530,047; U.S. Ser. No. 11/489,384 filed Jul. 18, 2006 entitled METHOD AND SYSTEM FOR SIMULATING STATE RETENTION OF AN RTL DESIGN, now U.S. Pat. No. 7,610,571; U.S. Ser. No. 11/489,385 filed Jul. 18, 2006 entitled SIMULATION OF POWER DOMAIN ISOLATION, now U.S. Pat. No. 7,596,769; U.S. Ser. No. 11/518,339 filed Sep. 8, 2006 entitled LOW POWER SCAN TEST FOR INTEGRATED CIRCUITS; U.S. Ser. No. 11/586,879 filed Oct. 25, 2006 entitled METHOD AND SYSTEM FOR EQUIVALENCE CHECKING OF A LOW POWER DESIGN, now U.S. Patent Application Publication No. 2008/0127014; U.S. Ser. No. 11/519,381 filed Sep. 11, 2006 entitled TEST GENERATION FOR LOW POWER CIRCUITS, now U.S. Patent Application Publication No. 2008/0071513; U.S. Ser. No. 11/588,927 filed Oct. 26, 2006 entitled METHOD AND SYSTEM FOR CONDUCTING A LOW-POWER DESIGN EXPLORATION, now U.S. Patent Application Publication No. 2008/0126999; U.S. Ser. No. 11/590,068 filed Oct. 30, 2006 entitled METHOD AND APPARATUS FOR POWER CONSUMPTION OPTIMIZATION FOR INTEGRATED CIRCUITS, now U.S. Pat. No. 7,551,985; U.S. Ser. No. 11/590,076 filed Oct. 30, 2006 entitled METHOD AND SYSTEM FOR VERIFYING POWER SPECIFICATIONS OF A LOW POWER DESIGN, now U.S. Patent Application Publication No. 2008/0127015; and U.S. Ser. No. 60/855,443 filed Oct. 30, 2006 entitled METHOD AND APPARATUS FOR GENERATING TEST BENCH FOR LOW POWER DESIGN. Each of these commonly owned patent applications is expressly incorporated in this patent application as if set forth herein in full.

BACKGROUND OF THE INVENTION

1. Field of the Invention

The invention relates to technology for designing and verifying an integrated circuit ("IC") design.

2. Description of the Related Art

With the rapid growth of the wireless and portable electronic markets, there is a constant demand for new technological advancements. This has resulted in more and more functionality being incorporated into battery-operated products, increasing challenges for power management of such devices.

Such challenges include minimization of leakage power dissipation, designing efficient packaging and cooling systems for power-hungry IC's, or verification of functionality or power shut-off sequences early in the design. These challenges are expected to become even more difficult with the continuous shrinking of process nodes using today's CMOS technology. Managing design and verification for power will be as critical, if not more than, for timing and area in today's IC design flow for portable consumer electronics.

Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavior descriptions of the IC device and translates this high-level design language into netlists of various levels of abstraction. Essentially, the process to implement an electronic device begins with functional design and verification (e.g., using RTL), and then proceeds to physical design and verification.

Conventional power optimization and implementation techniques are only leveraged at the physical implementation phase of the design. Certain advanced power management techniques like multiple power domains with power shut-off (PSO) methodology can only be implemented at the physical level (i.e., post synthesis). These advanced power management design techniques significantly change the design intent, yet none of the intended behavior can be captured in the RTL. This creates a large gap in the RTL to GDSII implementation and verification flow where the original RTL is no longer reliable and cannot be used to verify the final netlist implementation containing the advanced power management techniques.

In addition, these specialized power management techniques at the physical implementation stage cannot be used by EDA tools at other stages of the design process, and therefore cannot be used by EDA tools at an earlier RTL or gate level stage of the IC design process to perform, for example, functional verification. One reason this is important is because verification of low power designs only at the physical implementation stage of the design process may not capture all potential design flaws within the IC, particularly sequence-related problems for power modes that are ideally tested at the functional stage of the IC design process.

Therefore, there is a need for an improved approach for designing electronic circuits with specialized power requirements, such as low power designs.

SUMMARY OF THE INVENTION

Some embodiments of the present invention provide an improved method and system for designing electronic circuits with specialized power requirements, such as low power designs. In some embodiments, the invention is implemented using a single file format, that captures power-related design intent information, power-related power constraints, and power-related technology information for an integrated circuit design. The single file format may be accessed and used by EDA tools throughout the EDA implementation flow to design and verify the integrated circuit. Other and additional objects, features, and advantages of the invention are described in the detailed description, figures, and claims.

Some aspects of the invention involve a method of adding power control circuitry to a circuit design at each of an RTL and a netlist level includes demarcating multiple power domains within the circuit design. Multiple power modes are specified. Each power mode corresponds to a different combination of on/off states of the multiple demarcated power domains. Isolation behavior is defined relative to respective power domains.

In some other aspects, an article of manufacture includes a computer readable medium encoded with code structure instructing a circuit design process to include power control behavior in a circuit design at each of an and a netlist level. The behavior includes multiple power domains demarcated by design objects of the circuit design and multiple power modes each power mode including a different combination of on/off states of the multiple demarcated power domains.

In some other aspects, the invention provides a method of designing power control circuitry for an integrated circuit design at each of an RTL and a netlist level. the method includes producing a power specification encoded in computer readable medium. The specification specifies multiple power domains demarcated by design objects of the circuit design and also specifies multiple power modes each power mode including a different combination of on/off states of the multiple demarcated power domains. The specification is used at multiple stages of a circuit design processes such as at two or more of simulation, logic synthesis, placement and test.

BRIEF DESCRIPTION OF DRAWINGS

FIG. 8 describe behavior for an example IC design.

DETAILED DESCRIPTION OF THE PREFERRED EMBODIMENTS

Some embodiments of the present invention provide an improved method and system for implementing electronic circuits with specialized power requirements, such as low power designs. As used herein, the term "implementing electronic circuits" includes at least activities for design creation, verification, physical implementation, analysis, and sign-off of the electronic design.

As noted above, many modern IC designs have special power requirements that are important for the proper operation of the IC's final electronic product. For example, consider a mobile or cellular telephone product. Such products are designed for portable use, and hence any ICs that are intended for use in cellular telephones may need to be designed with special power management requirements to prolong battery life. Therefore, ICs that are intended for mobile products such as cellular telephones are often designed with low power requirements and specifications.

In some embodiments, the invention is implemented using a single file format that captures power-related design intent information, power-related power constraints, and power-related technology information for an integrated circuit. The single file format may be integrated into an existing HDL, or may be maintained as a separate file. The single file format may be accessed and used by EDA tools throughout the EDA design flow to design and verify the integrated circuit design.

The present invention addresses the current limitation in the design automation tool flow by enabling the capture of the designer's intent for advanced power management techniques. The invention provides support for design and technology-related power constraints to be captured in a single file for use throughout the flow. The entire verification, validation, synthesis, test, physical synthesis, routing, analysis and signoff tool flow can be configured to support the inventive methodology.

The automation that is enabled through infrastructure support of the present invention will be the answer to the growing power management design challenges faced by the industry. The present invention will bring productivity gains and improved quality of silicon to designers, and can be used without requiring any change to current legacy RTL implementations.

Figure 1:
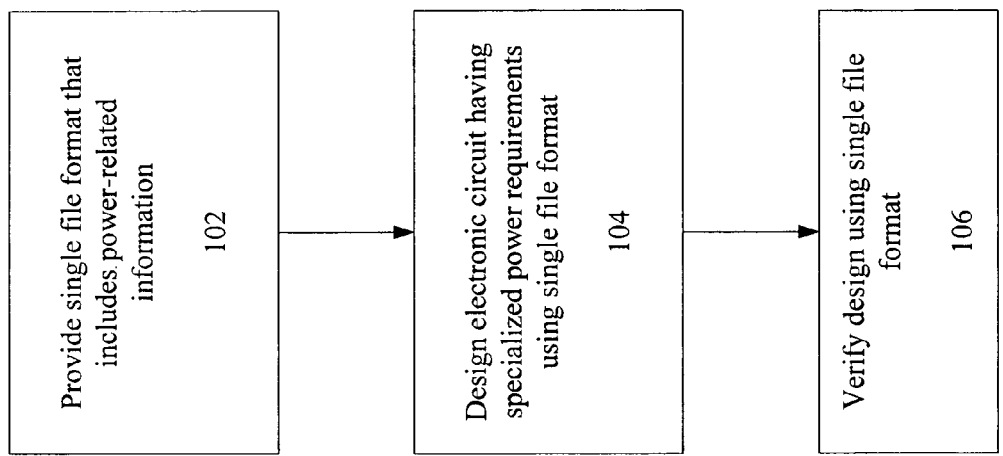
FIG. 1 is a process flow of a process for using a single file format for power information according to an embodiment of the invention.

FIG. 1 shows a flowchart of a process for implementing electronic design according to some embodiments of the invention. At 102, a single file format provides power-related information for implementing an electronic design having specialized power requirements. The single file format consolidates the appropriate power-related information that is needed to specify a specialized power requirements for an electronic design.

By consolidating information into a single file format, this removes barriers to broad implementation and adoption of advanced power management techniques for IC designs. Moreover, the single file format provides a common and universally accessible format that can be used by multiple types of EDA tools throughout the design flow of the integrated circuit design.

According to one embodiment, the single file format includes power-related information relating to the following categories:
1. Design Intent Information
2. Power Constraint Information
3. Technology Information It is noted that in some embodiments, not all of these categories of information need to be in the single file format. For example, in some embodiments, only the power-related design intent and power-related technology information are utilized.

The power-related design intent information is a category of information that identifies the power-related design intent for different portions of the IC design. Different portions of the design having similar intended attributes can be collected together into groupings called "power domains." In some embodiment, each power domain can be individually managed to achieve the power management goals established for that power domain. Examples of such management techniques that can be applied to a power domain includes the ability to power up or down a particular power domain as a group or specification of a given voltage level for the design blocks within a power domain.

Further, design intent information includes different power-related operating characteristics of the design portions within the IC design. For example, there may be many different intended modes of operation for the IC design, with each mode of operation having a different set of power-related characteristics. For instance, consider an IC design having three power domains, PD_a, PD_b, and PD_c. In a first mode of operation all three power domains may be active. In a second mode of operation, power domain PD_a may be switched off or asleep to save power, but the other two power domains PD_b and PD_c are both active. In a third mode of operation, both PD_a and PD_b are active, but PD_c is shut off. As is evident, there may be many variations of operating characteristics for the different power modes. Other types of power constraint information may also be employed within the scope of the invention. For example, there may be different power-related sequences of operations for the IC design, in which different sequences exist for the different power modes.

The power-related constraint information is a category of information that provides directives to guide optimization and analysis of the IC design. Examples of such power-related constraint information include:

Dynamic or leakage power constraints, e.g., maximum threshold dynamic or leakage at chip or module levels IR drop limit constraints, e.g., maximum IR drop limit for a power switch Electromigration (EM) constraints, e.g., maximum EM thresholds Saturation current constraints, e.g., saturation current limits for a power switch Leakage current constraints, e.g., leakage current for a power switch Timing constraints, e.g., elapsed time or cycle time constraints to power up or down or timing constraints for multi-mode and multi-corner analysis (for at least three cases: (i) single mode, single corner; (ii) multi-mode, single corner, (iii) multi-mode, multi-corner)

Power-related technology information generally comprises a library of technology and design blocks to represent specific devices that may be used to implement the IC design. In some embodiments, the technology design library includes a library of technology for implementing power-related IC designs.

At 104, an IC design having specialized power requirements is created using the single file format. There may be a range of activities that are performed to implement the design creation process. Examples of such activities include synthesis design constraint (SDC) generation, synthesis, and design for test activities.

The next action 106 is to verify the design using the single file format. As used herein, the term "verify" or "verification" includes both static and dynamic verification. Numerous types of verification activities may be performed using the instant invention. For example, the verification activities may include, formal verification, simulation, simulation acceleration, and emulation. The single file format contains sufficient information to allow verification of the desired power management designs for the different range of anticipated EDA activities.

Figure 2:
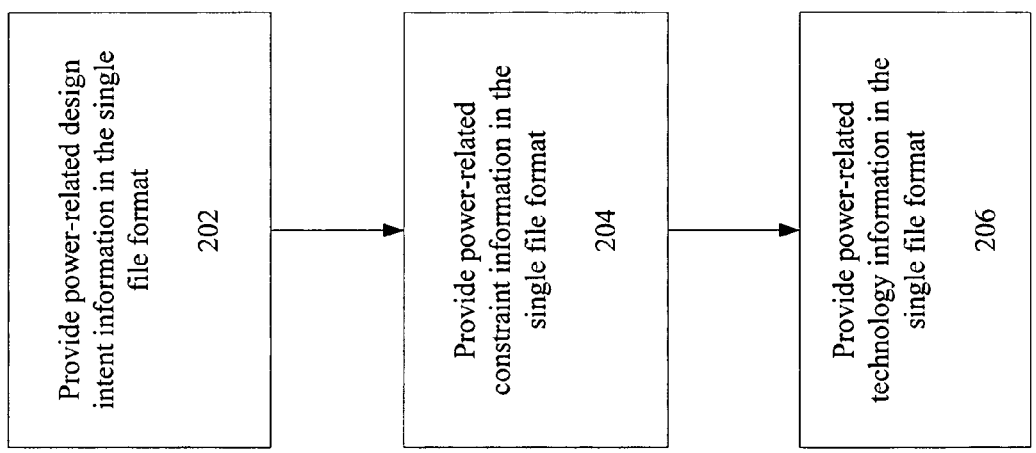
FIG. 2 is a process flow of a process for implementing IC design using a single file format for power information according to an embodiment of the invention.

FIG. 2 shows a flowchart of a process for implementing action 104 to create an IC design using the single file format. At 202 of the process, power-related design intent information is provided in the single file format. This information may be provided, for example, by identifying one or more power domains and/or voltage islands within the IC design. This action may also be taken by identifying the different modes of operation or sequence of modes for the IC design or for specific portions of the IC design.

At 204, power-related constraint information is provided. This action may be performed, for example, by identifying dynamic or leakage power constraints, IR drop limit constraints, EM constraints, saturation current constraints, leakage current constraints, or timing constraints for the IC design.

At 206, technology design information is provided for the IC design. This action may be performed, for example, by identifying and incorporating a library of technology designs that are or may be employed to implement the IC design.

Figure 3A:
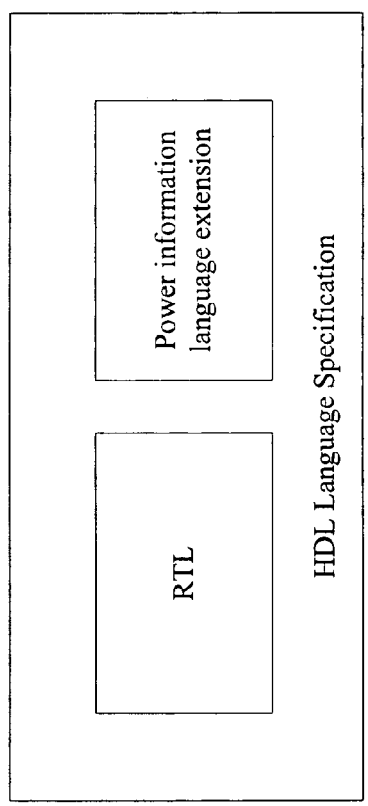
FIGS. 3A and 3B illustrate example approaches for using a power information format with an HDL according to embodiments of the invention.

There are numerous ways to implement a single file format for the power information. FIG. 3A shows a first example approach in which the single file format is implemented as a language extension for an existing HDL. In this approach, language constructs pertaining to power information are added to extend the base functionality of a conventional HDL such as Verilog or VHDL.

Figure 3B:
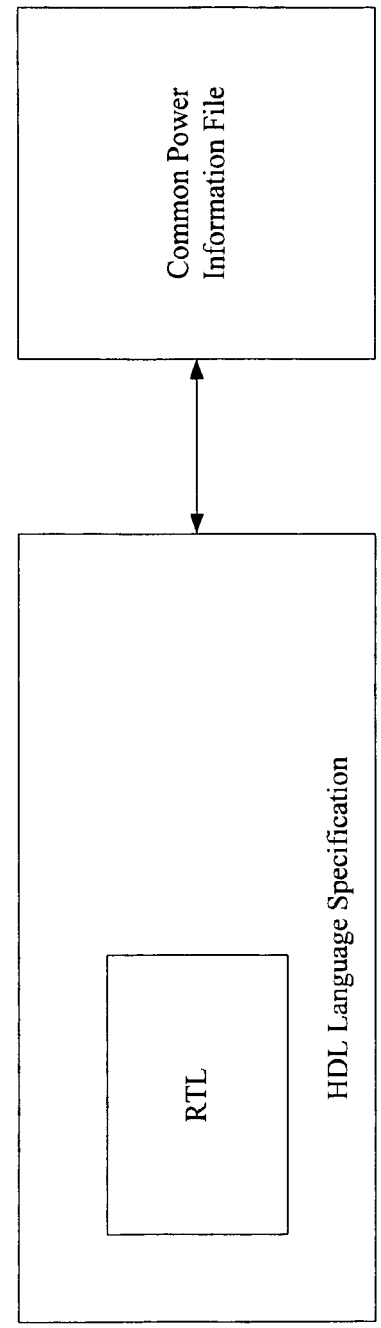

FIG. 3B shows a second example approach to implement a single file format for the power information. In this approach, the power information is maintained as a separate file format from the HDL file format. As such, the power information is contained in a separate file from the HDL file in a common power information file.

Either approach can be used within the scope of some embodiments of the invention. In some embodiments, the single file format is adopted as a standard for implementing power information across different EDA tool platforms.

Figure 4:
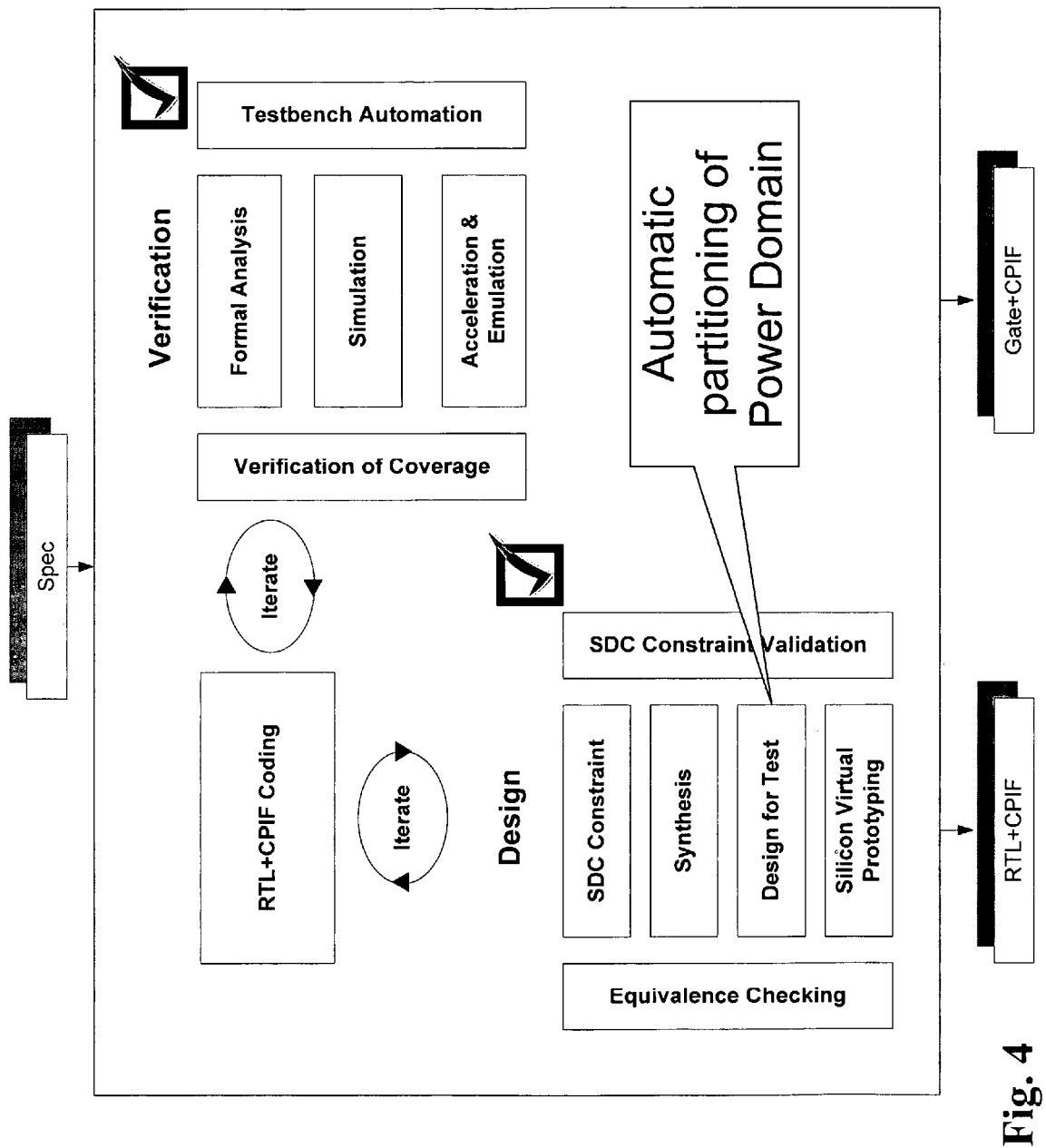
FIGS. 4 and 5 illustrate architectures and process flows for using performing IC design, verification, and physical implementation using common EDA tools according to an embodiment of the invention.

FIG. 4 illustrates a flow of EDA activities that may be performed to implement some embodiments of the invention to perform the logical design and functional verification of an IC design. Initially, a specification is created for the intended IC design. During the design phase, RTL for the expected IC design is created/generated along with power information in the single file format. The single file format may be referred to herein as a Common Power Information Format or Common Power Information File (either or both represented as "CPIF").

Numerous EDA actions may be performed during the design phase, including SDC constraint generation, logical synthesis, design for test activities, silicon virtual prototyping, and equivalence checking. Many actions taken by these EDA tools can now be performed for the power requirements because the CPIF is accessible to provide the power information. For example, logic synthesis activities can now be effectively performed for specific power requirements due to the availability of CPIF. This is in contrast to conventional EDA tools and RTL designs that do not have power information in an easy and usable format, and therefore cannot effectively perform such activities for IC design having specialized power requirements.

Because the power information is available in the CPIF, logical and functional verification may also be performed at this stage. Examples of such verification activities and related tools include formal analysis, simulation, simulation acceleration, and emulation. In addition, other activities that may be performed include coverage verification and testbench automation. Again, this is in contrast to conventional EDA tools and RTL designs for which functional verification cannot be performed, since conventional RTL designs do not have sufficient power information.

The overall flow may iterate between the design process, verification process, and different version of the RTL and CPIF designs, based upon accessing and evaluating the power information in the CPIF. This is a significant advantage of the present approach, which allow potential errors in the logical or functional design of the IC to be spotted at this early stage of the design process and corrected prior to physical implementation.

The output of this process flow is a suitably designed and verified set of RTL and CPIF design information. In addition, state retention power gating (SRPG) information may be created for aspects of the design that must retain state information during the course of operation. The state retention power gating information may also be associated with the same or different CPIF to hold power information for the gate-related portions of the IC design.

Figure 5:
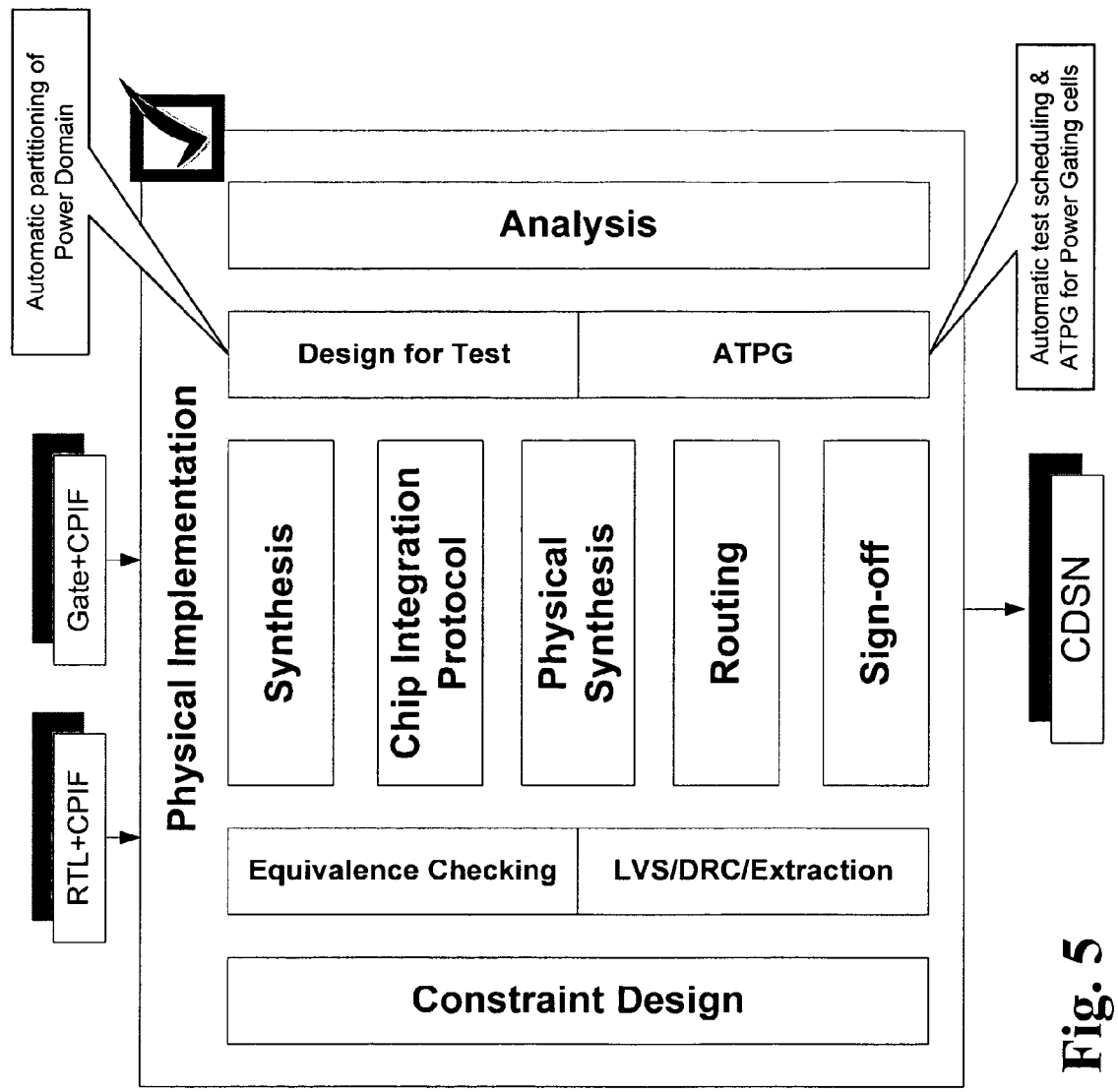

Thereafter, the typical flow of EDA activities proceeds to the physical design and implementation stages. FIG. 5 illustrates the flow of EDA activities that may occur after the activities from FIG. 4 to physical design and implementation of the IC design according to some embodiments of the invention. The inputs to these stages of activities include the RTL and CPIF as well as the gate and CPIF information that was outputted from the design activities of FIG. 4.

Numerous EDA actions may be performed during the physical design and implementation phase, including synthesis, chip integration prototyping, physical synthesis, routing, DFT, ATPG, Equivalence Checking, LVS, DRC, Extraction, and sign-off activities. Sign-off activities may be performed using the CPIF information, including timing and power analysis, static and dynamic IR drop analysis, electromagnetic analysis, thermal analysis, noise analysis, electrical analysis, power, timing, noise, IR drop, EM, noise, or thermal analysis.

Here, it is of particular advantage that a commonly understood CPIF format is employed that can be used by each and every EDA tool in the physical design and implementation flow. As such, this provides immense efficiencies over the prior approach in which proprietary and customized calls were used to provide power management implementations for IC designs at the physical level. The output of the physical design and implementation stage is, for example, a GDSII file.

Illustrative Embodiment for Low Power

Embodiments of invention provide particular advantages when used to implement power management and low power electronic designs, e.g., to minimize leakage power dissipation, design efficient packaging and cooling systems, or to verify functionality of power shut-off sequences early in the design.

As noted above, conventional current power optimization and implementation techniques are only leveraged at the physical implementation phase of the design. The present invention addresses the current limitation in the design automation tool flow by enabling the capture of the designer's intent for advanced power management techniques. CPIF provides support for design and technology-related power constraints to be captured in a single file for use throughout the flow. The entire verification, validation, synthesis, test, physical synthesis, routing, ATPG, analysis and signoff tool flow can be configured to support the a CPIF-based methodology. The automation enabled through CPIF infrastructure support answers the growing power management design challenges faced by the industry.

For low power designs, CPIF supports the ability to specify that certain portions of the design can be individually powered on or off separately from other portions of the design. One reason for doing so is to minimize leakage power by making sure that portions of the design that are not needed at any given moment in time can be shut down.

In addition, CPIF is able to specify that certain portions of the design operate at different voltage levels relative to other portions of the design. In this way, non-critical blocks or design blocks that do not require higher voltage can be implemented at lower voltage levels, thereby minimizing dynamic power consumed by the IC.

To implement this type of design, some embodiments of CPIF support specification of multiple power domains, with each power domain potentially having different operating characteristics and voltage levels from other power domains. Power domains at different voltage levels can be tied to different voltage rails. Level shifters can be used to shift voltage levels up or down between different power domains that are at different voltage levels.

Different power modes can be configured that specify which power domains are active which are inactive. A switch can be employed to turn on or off the flow of power to a particular power domain.

Multiple power modes can be configured to provide numerous variations in the different combinations of power domains that are on or off at any given moment in time.

Transition information can be configured to identify the conditions under which one mode changes to another mode. Transitions may be configured using Boolean expressions. Sequence information may be used to identify the order of legal or valid transitions.

Therefore, a hierarchy of information may be established for the low power design, from power domain information at one level of the hierarchy to power mode information at another level that specifies the on/off state of power domains. At yet another level of the hierarchy, the transition information specifies the conditions under which the power modes change, to the level of the hierarchy at which sequences specify the permitted ordering of transitions.

In an illustrative embodiment, the CPIF file includes power-related design intent and power constraint information particularly relevant to low power designs. For example, such, information could include the following example information:

Power domain
   Logical: define hierarchical modules as domain members for flat or hierarchical domains
   Physical: define power/ground nets and connectivity
   Analysis view: define timing library sets for power domains
Power Logic
   Level Shifter Logic
   Isolation Logic
   State-Retention logic
   Switch Logic & Control Signals
Power mode
Transition mode/time
Power sequence It is noted that such constructs are not supported by conventional HDL languages such as Verilog and VHDL. As such, there is no way in which such low power specifications can be implemented using conventional HDLs.

This can create severe problems if it is desired to implement low power designs using conventional approaches. For example, there is no way to verify that the blocks in a design are adequately tied to appropriate power control structures, such as level shifters, etc.

When in the physical implementation stage, specialized and custom commands can be used to implement low power structures in the IC design using conventional tools. However, by this point, it is already very late in the design process. There may already be numerous flaws in the IC design relating to the low power design that cannot be identified and corrected at this stage.

For example, consider a low power design that specifies transitions between the different power modes. Conventional approaches do not allow specification and verification of the transitions between different modes at the RTL level. Even if this is attempted at the physical implementation stage, it is very difficult if not impossible to adequately verify the functional behavior of the IC design through the different transitions that actually occur in a typical IC design. Instead, this type of verification should be performed at an earlier stage of the EDA flow.

Figure 6:
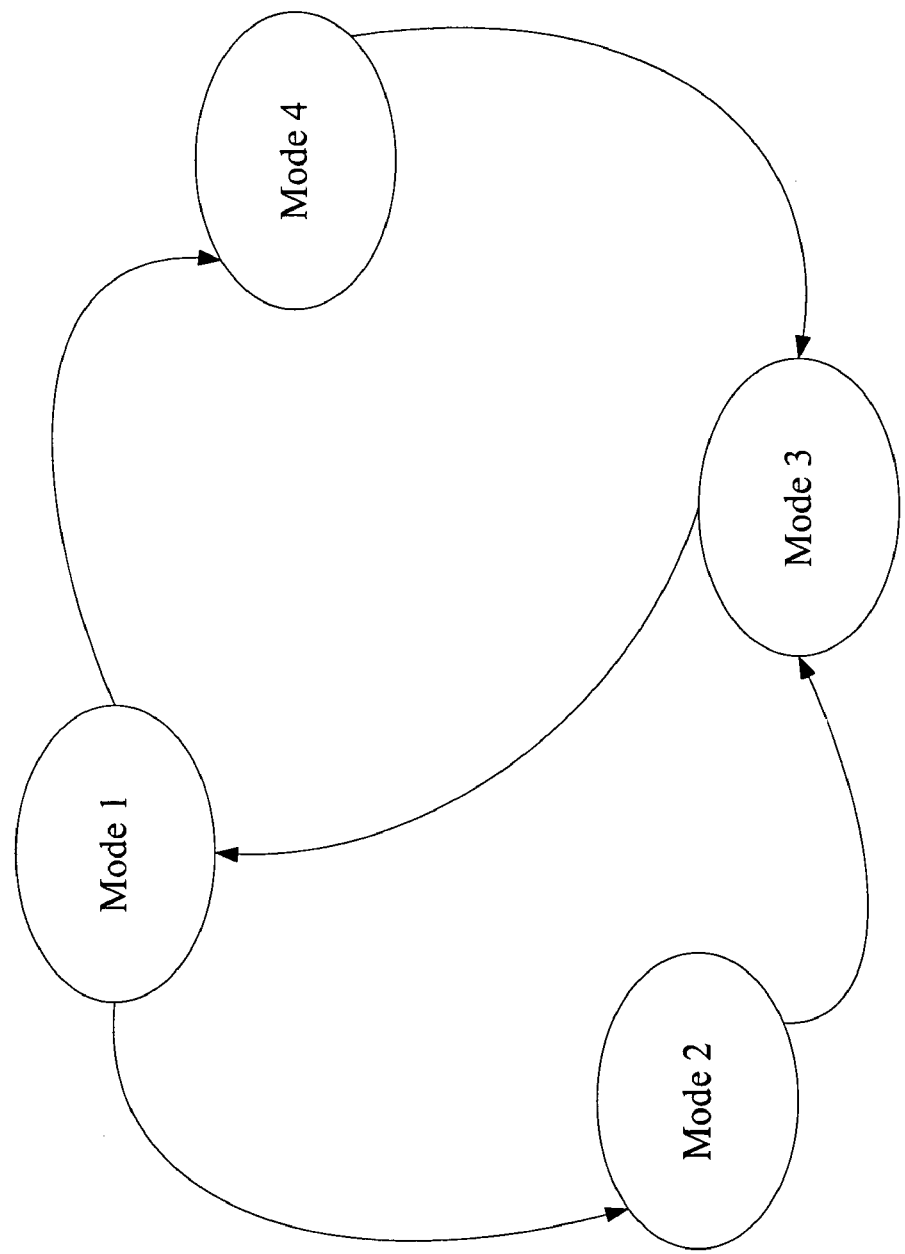
FIG. 6 illustrates an example sequence for different power modes.

As another example, consider a low power design that specifies sequence information. An example of a sequence of power modes is illustrated in FIG. 6. At the physical implementation stage with conventional EDA tools, it is very difficult if not impossible to adequately verify the functional behavior of the IC design through the entire sequence of power modes. This is the type of verification that should also be performed at an earlier stage of the EDA flow.

Because conventional EDA tools and HDLs do not have the appropriate constructs to specify power information for sequences and transitions, the needed verification is not possible using conventional EDA tools. This can also significantly affect sign-off activities during EDA processing.

In the present invention, since the design intent, power constraint, and/or technology library information are embedded within the CPIF file, such verification and sign-off processing are possible even at the functional stage. In fact, the information can be used throughout the entire EDA tool flow to more efficiently and effectively allow designer to design, verify, and physically implement the low power design.

In an exemplary implementation of CPIF, "CPIF objects" refer to objects that are being defined (named) in the CPIF file. The following are examples of CPIF objects that used in CPIF according to some embodiments of the invention:

Analysis View—A view that associates a delay calculation corner with a constraint mode. The set of active views represent the different design variations that will be timed and optimized.

Constraint Mode—A mode that defines one of possibly many different functional, or test behaviors of a design. A constraint mode is defined through clock definitions, constants, exceptions.

Delay Calculation Corner—References all information to calculate the delays for a specific condition of the design.

Library Set—A set (collection) of libraries. By giving the set a name it is easy to reference the set when defining delay calculation corners. The same library set can be referenced multiple times by different delay calculation corners.

Operating Condition—A condition determined through a specific set of process, voltage and temperature values under which the design must be able to perform.

Power Domain—A collection of logic blocks (hierarchical instances) and leaf instances that use the same power supply during normal operation, and that can be powered on or off at the same time for an operation. Power domains follow the logic hierarchy. They can be nested within another power domain. A virtual domain is a power domain inside an IP instance. It can only be associated with a list of IO ports of the IP block. In some embodiments, one cannot declare instances that belong to different logic hierarchies to be part of the same power domain.

Power Mode—static state of a design that indicates the ON and OFF status of each power domain.

In some embodiments, the technology information includes special library cells for power management. The following are examples of library cells that can be used in some embodiments of the invention:

Always On Cell—A special buffer or latch or flop located in a powered down domain, and whose power supply is continuous on even when the power supply for the rest of the logic in the power domain is off.

Isolation Cell—Logic used to isolate signals between two power domains where one is powered on and one is powered down. The most common usage of such cell is to isolate signals originating in a power domain that is being powered down, from the power domain that receives these signals and that remains powered on.

Level Shifter Cell—Logic to pass data signals between power domains operating at different voltages.

Power Switch Cell—Logic used to disconnect the power supply from all the gates in a power domain.

State Retention Cell—Special flop or latch used to retain the state of the cell when its main power supply is shut off.

In some embodiments, CPIF can be implemented hierarchically. For example, many design teams can contribute to different blocks in the design. These blocks, whether they are soft blocks or hard blocks (such as IP instances, where the internal details of the block are unknown) can each have their own CPIF file.

Figure 7:
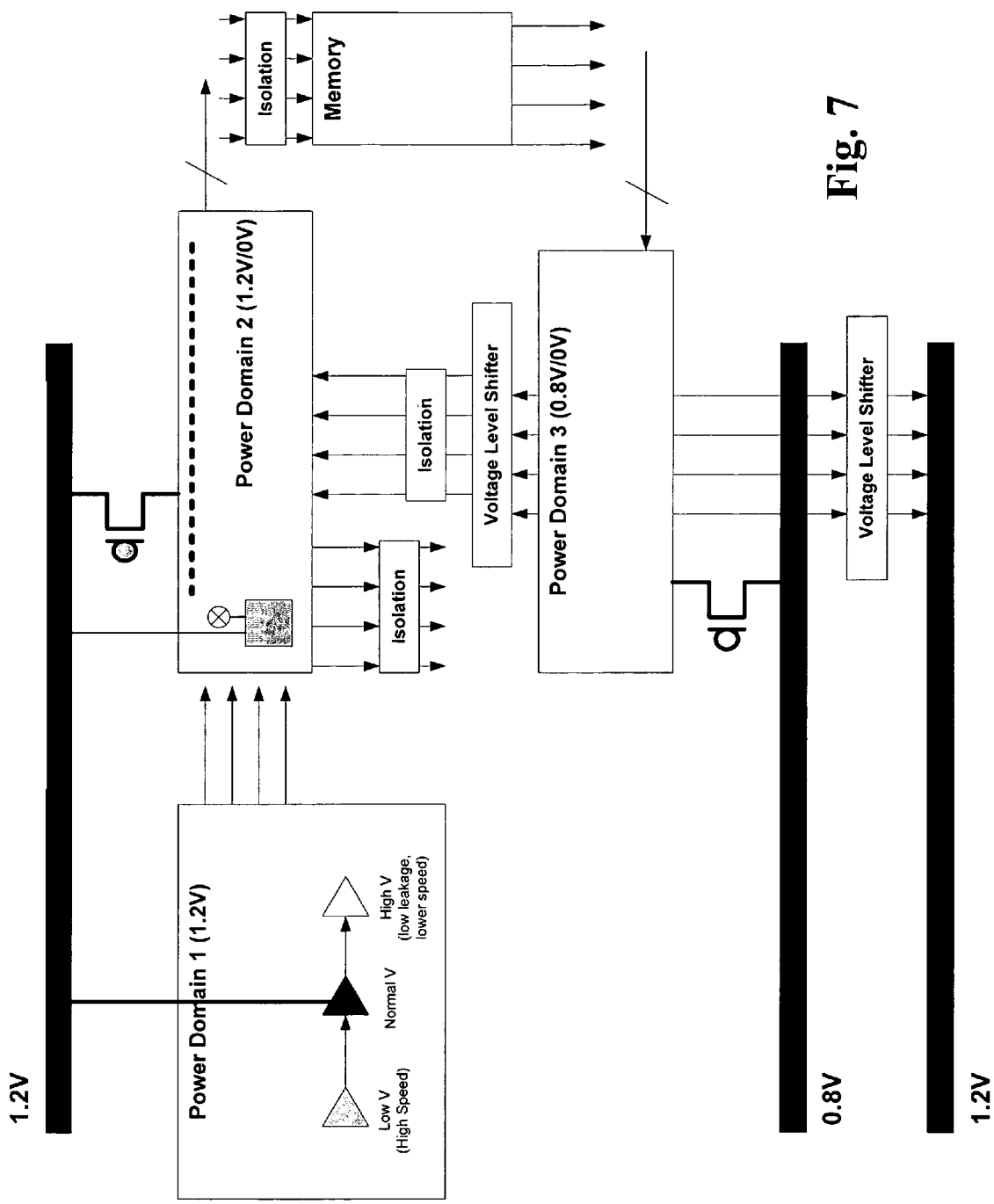
FIG. 7 is an example IC design.

FIG. 7 shows an example design that can be used in conjunction with CPIF. CPIF is used to track and maintain the power-related design intent, power-related power constraint, and power-related technology information for this design. This example design shows characteristics of advanced power management techniques which can be specified using CPIF. Three power domains are shown: Power Domain A, Power Domain B, and Power Domain C.

Power Domain A includes a collection of logic blocks that use the same power supply during normal operation. In this example, Power Domain A operates at 1.2 V. Power Domain A is coupled to a power rail operating at 1.2V. It is noted that a switch is not used to couple Power Domain A to the 1.2V power rail. As a result, Power Domain A is always "on", and cannot be turned off.

Power Domain A includes three cells having different operating parameters. A first cell is associated with a low $V_t$, which provides operating characteristics of high speed and high leakage. A second cell is associated with a normal $V_t$, which provides operating characteristics of normal speed and normal leakage. A third cell is associated with a low $V_t$, which provides operating characteristics of low speed but also low leakage. Designers will attempt to balance the selection of these combination of cells to achieve a desired set of performance characteristics with minimum leakage.

Power Domain B also includes a set of logic blocks. Power Domain B can be powered on or off depending upon the particular power mode that is being employed. Therefore, Power Domain A can be at either 1.2V or OV. In this example, a power switch is used to power off or on the power domain.

Power Domain B contains an SRPG cell to maintain state information during the periods of time in which the power domain is powered down. It can be seen that the SRPG is separately coupled to the 1.2V power rail so that it can retain state even when the power switch has cut off power generally to the power domain.

Power Domain B is associated with appropriate isolation logic to ensure that inadvertent and unintended data is not propagated to other blocks when the power domain is powered down.

Power Domain C is a collection of logic blocks which all operate at 0.8V, and the power domain is therefore connected to a power rail at 0.8V. Power Domain C can be powered on or off depending upon the particular power mode that is being employed. Therefore, Power Domain C can be at either 0.8V or 0V. In this example, a power switch is used to power off or on the power domain.

Power Domain C is also associated with appropriate isolation logic to ensure that inadvertent and unintended data is not propagated to other blocks when the power domain is powered down.

Voltage level shifters are used to interact with other blocks that operate at other voltage levels. For example, since Power Domain B operates at 1.2V and Power Domain C operates at 0.8V, voltage level shifters are used between these two power domains.

FIG. 8 shows an example table that describe the behavior of the power domains in FIG. 7. These behaviors are embedded as power-related design intent and power-related power constraint information within CPIF. This table illustrates that different power modes may be established to control the on/off behavior of different power domains. Sequences of the different power modes may be established in the CPIF. Transitions between the different power modes may also be specified in the CPIF.

Different control signals may be specified for the design to control a power domain. A signal may be used to enable a power switch to turn a particular power domain on or off. Another signal may be used to enable a isolation cell. A power gating signal may be used to enable a power gate.

Figure 9:
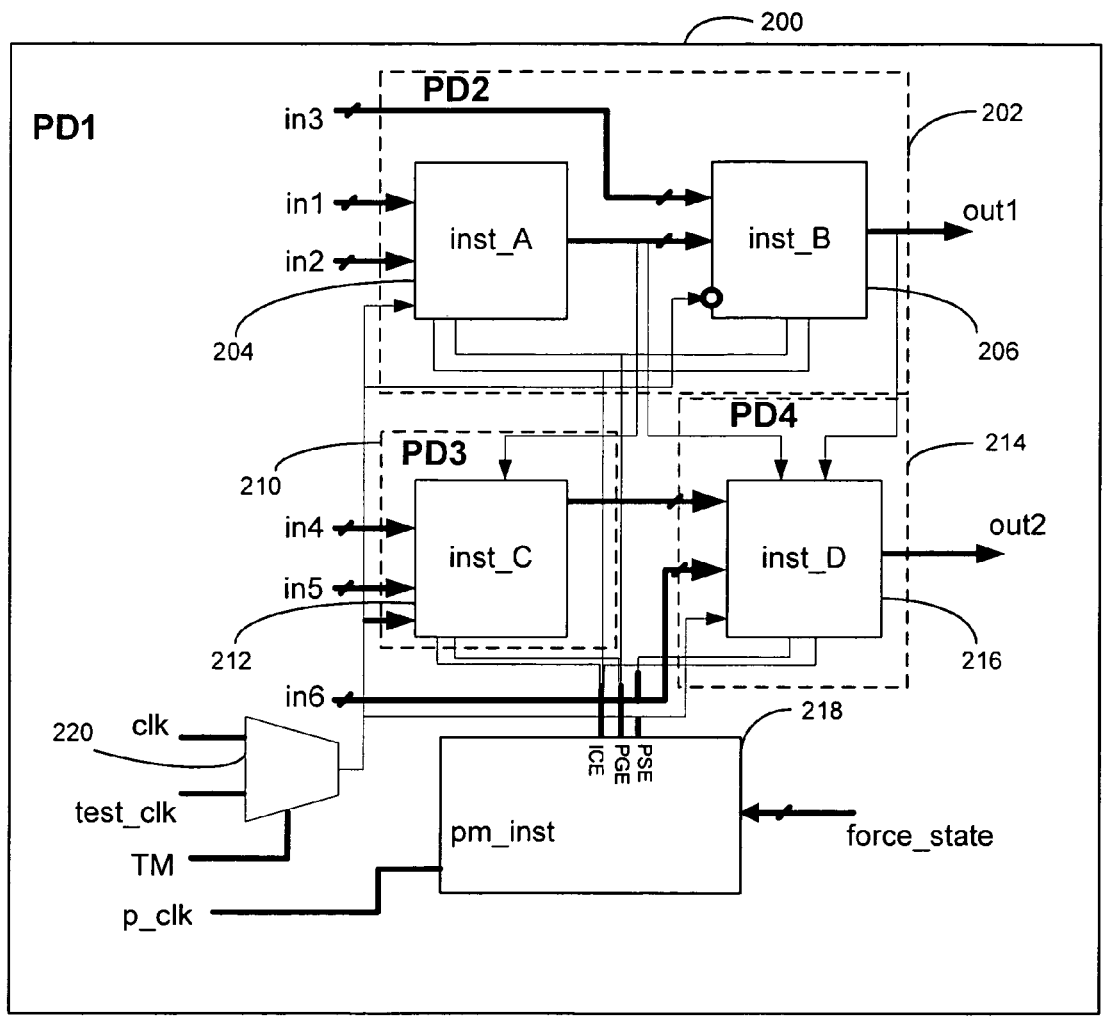
FIG. 9 illustrates an example design incorporating power information according to an embodiment of the present invention.

FIG. 9 illustrates an example design incorporating power information according to an embodiment of the present invention. The example design 200 includes four logic instances inst_A 204, inst_B 206, inst_C 212, and inst_D 216, a power manager instance pm_inst 218, and a clock gating logic 220. Each design instance includes a set of input and output signals. The clock gating logic 220 receives inputs clk and test_clk, and a control signal TM. The output of the clock gating logic controls the gating of the clocks to instances inst_A 204, inst_B 206, inst_C 212, and inst_D 216, respectively.

As shown in FIG. 9, the example design includes four power domains. The top-level design (also referred to as top design) and the power manager instance pm_inst 218 belong to the default power domain PD1 200. Instances inst_A 204 and inst_B 206 belong to the power domain PD2 202. Instance inst_C 212 belongs to power domain PD3 210. Instance inst_D 216 belongs to power domain PD4 214. Table 2 shows the static behavior of the four domains according to embodiments of the present invention.

TABLE 2

| Power Domain | Power Mode | | | |
|---|---|---|---|---|
| | PM1 | PM2 | PM3 | PM4 |
| PD1 | ON | ON | ON | ON |
| PD2 | ON | OFF | OFF | OFF |
| PD3 | ON | ON | OFF | OFF |
| PD4 | ON | ON | ON | OFF |

The power manager instance (pm_inst) 218 generates three sets of control signals, namely pse_enable, pge_enable, and ice_enable, to control each power domain. Table 3 shows control signals of the power manager instance pm_inst 218 for controlling the four power domains according to embodiments of the present invention.

TABLE 3

| | Power Control Signals | | |
|---|---|---|---|
| Power Domain | power switch enable (PSE) | isolation cell enable (ICE) | power gating enable (PGE) |
| PD1 | no control | no control | no control |
| PD2 | signal pse_enable[0] | signal ice_enable[0] | signal pge_enable[0] |
| PD3 | pse_enable[1] | ice_enable[1] | pge_enable[1] |
| PD4 | pse_enable[2] | ice_enable[2] | pge_enable[2] |

The following is an example netlist of a CPF file of the top design according to an embodiment of the present invention.

```
# Define top design
set_top_design top
# Set up logic structure for all power domains
create_power_domain -name PD1 -default
create_power_domain -name PD2 -instances {inst_A inst_B} \
    -shutoff_condition {pm_inst.pse_enable[0]}
        create_power_domain -name PD3 -instances inst_C \
-shutoff_condition {pm_inst.pse_enable[1]}
create_power_domain -name PD4 -instances inst_D \
    -shutoff_condition {pm_inst.pse_enable[2]}
# Define static behavior of all power domains and specify timing
constraints
create_power_mode -name PM1 -sdc_files ../SCRIPTS/cm1.sdc \
    -activity_file ../SIM/top_1.tcf
create_power_mode -name
PM2 -off_domains PD2 -sdc_files ../SCRIPTS/cm2.sdc
create_power_mode -name PM3 -off_domains {PD2 PD3}
create_power_mode -name PM4 -off_domains {PD2 PD3 PD4}
# Set up required isolation and state retention logic of all domains
create_state_retention_logic -restore_edge {pm_inst.pge_enable[0]} \
    -instances inst_A.reg_bank_1.out
    create_state_retention_logic -power_domain PD3 -restore_edge \
{pm_inst.pge_enable[1]}
create_state_retention_logic -power_domain PD4 -restore_edge \
    {pm_inst.pge_enable[2]}
    create_isolation_logic -from PD2 -isolation_condition \
{pm_inst.ice_enable[0]} -isolation_output high
create_isolation_logic -from PD3 -isolation_condition \
    {pm_inst.ice_enable[1]}
create_isolation_logic -from PD4 -isolation_condition \
{pm_inst.ice_enable[2]}
```

According to embodiments of the present invention, the following commands are used to simulate isolation and/or state retention of a power domain using a hierarchical RTL data structure.

The create_isolation_logic command is used to add isolation cells for certain designer-specified power domains. This command allows a designer to specify which pins are to be isolated by 1) specifying all pins to be isolated with the -pins option; 2) selecting only output pins in the power domains listed with the -from option; 3) selecting only input pins in the power domains listed with the -to option; and 4) combining options to filter the set of pins. Specifically, a designer may 1) combine -pins and -from options to isolate those pins in the designer-specified list that are also output pins in a power domain listed with the -from option; 2) combine -pins and -to options to isolate those pins in the designer-specified list that are also input pins in a power domain listed with the -to option; 3) combine -from and -to options to isolate input pins that belong to a power domain listed with the -to option but that are also driven by a net coming from a power domain listed with the -from option; 4) combine -pins, -from and -to options to isolate those input pins in the designer-specified list that belong to a power domain listed with the -to option but that are also driven by a net coming from a power domain listed with the -from option; and 5) exclude certain pins with the -exclude option. An example use of the create_isolation_logic command is shown below.

```
create_isolation_logic
-isolation_condition expression
{-pins pin_list | -from power_domain_list | -to power_domain_list}...
[-exclude pin_list] [-location {from | to} ]
[-isolation_output {high|low|hold}]
[-cells cell_list] [-prefix string]
```

The options and their corresponding arguments of the create_isolation_logic command are shown as follows according to an embodiment of the present invention.

-cells cell_list: This option and its argument specify the names of the library cells that are used as isolation cells for the selected pins. By default, the appropriate isolation cells are chosen from the isolation cells defined with the define_isolation_cell command or from the library cells with isolation related .lib attributes.

-exclude pin_list: This option and its argument specify a list of pins that do not require isolation logic.

-from power_domain_list: This option and its argument limit the pins to be considered for isolation to output pins in the specified power domains. If specified with -to option, all input pins in the -to domains that are receiving signals from the -from domains will be isolated. The power domains are previously defined with the create_power_domain command.

-isolation_condition expression: This option and its argument specify a condition when the specified pins should be isolated. This condition is a function of pins.

-isolation_output {high|low|hold}: This option and its argument control and generate the output value at the output of the isolation logic in response to certain isolation condition being met. The output can be high, low, or held to the value, it has right before the isolation condition is activated.

-location {from|to}: This option and its argument specify the power domain to which the isolation logic is added. The from argument stores the isolation logic with the instances of the originating power domain, and the to argument stores the isolation logic with the instances of the destination power domain. The default argument is to -pins pin_list: This option and its argument specify a list of pins to be isolated. The designer may list input pins and output pins of power domains. The designer may further limit the pins to be isolated using the -from, -to, and -exclude options.

-prefix string: This option and argument specify the prefix to be used when creating the create_isolation_logic.

-to power_domain_list: This option and its argument limit the pins to be considered for isolation to input pins in the specified power domains. The power domains are previously defined with the create_power_domain command.

The create_level_shifter_rule command is used to add rules for adding level shifters. This command allows to specify on which pins to insert level shifters. This command allows designers to 1) specify all pins on which to insert level shifters with the -pins option; 2) select only output pins in the power domains listed with the -from option; 3) select only input pins in the power domains listed with the -to option; 4) combine options to filter the set of pins: 4a) combine -pins and -from options—only adds level shifters to those pins in the specified list that are also output pins in a power domain listed with the -from option; 4b) combine -pins and -to options—only adds level shifters to those pins in the specified list that are also input pins in a power domain listed with the -to option; 4c) combine -from and -to options—only adds level shifters to input pins that belong to a power domain listed with the -to option but that are also driven by a net coming from a power domain listed with the -from option; 4d) combine -pins, -from and -to options—only adds level shifters to those input pins in the specified list that belong to a power domain listed with the -to option but that are also driven by a net coming from a power domain listed with the -from option; 5) exclude specific pins through the -exclude option.

```
create_level_shifter_rule
-name string
{-pins pin_list | -from power_domain_list | -to power_domain_list}...
[-exclude pin_list] [-location {from | to} ]
[-cells cell_list] [-prefix string]
```

-cells cell_list: This option and its argument specify specifies the names of the library cells to be used to bridge the specified power domains. By default, the appropriate level shifter cells are chosen from the level shifter cells defined with the define_level_shifter_cell command or from the library cells with level-shifter related .lib attributes.

-exclude pin_list: Specifies a list of pins that do not require level shifters.

-from power_domain_list: Specifies the name of the originating (driving) power domains. The power domain must have been previously defined with the create_power_domain command.

-location {from|to}: Specifies where the level shifters must be stored: from stores the level shifters with the instances of the originating power domain; to stores the level shifters with the instances of the destination power domain; Default: to -name string: Specifies the name of the level shifter rule. Note: The specified string cannot contain wildcards.

-pins pin_list: Specifies a list of pins to be isolated. You can list input pins and output pins of power domains. You can further limit the pins to be isolated using the -from, -to, and -exclude options.

-prefix string: Specifies the prefix to be used when creating this logic. Default: CPF_LS_

-to power_domain_list: Specifies the names of the destination (receiving) power domains. The power domain must have been previously defined with the create_power_domain command.

The create_mode_transition command defines how the transition between two power modes is controlled.

```
create_mode_transition
-name string
-from_mode power_mode -to _mode power_mode
-start_condition expression [-end_condition expression]
[-clock_pin clock_pin [-cycles number | -latency float]]
```

-clock_pin clock_pin: Specifies the name of the clock pin that controls the transition.

-end_condition expression: Specifies the condition that acknowledges when the power mode transition is finished.

-cycles number: Specifies an integer of number of clock cycles needed to complete the power transition mode.

-from_mode (-to_mode) power_mode: Specifies the power mode from (to) which to transition. The mode must have been previously defined with the create_power_mode.

-latency float: Specifies the time it takes to transition. Specify the time in the units specified by the set_time_unit command.
-name string: Specifies the name of the power mode transition.
-start_condition expression: Specifies the condition that triggers the power mode transition.

The create_power_domain command creates a power domain and specifies the instances and boundary ports that belong to this power domain. By default, an instance inherits the power domain setting from its parent hierarchical instance or design, unless that instance was associated with a specific power domain. In addition, all top-level boundary ports are considered to belong to the default power domain, unless they have been associated with a specific domain. In CPF, power domains are associated with the design objects based on the logical hierarchy. The order in which you create the power domains is irrelevant.

```
create_power_domain
    -name power_domain
    { -default [-instances instance_list] [-boundary_ports pin_list]
    | -instances instance_list [-boundary_ports pin_list]
    | -boundary_ports pin_list }
    [ -shutoff_condition expression ]
```

-boundary_ports pin_list: Specifies the list inputs and outputs that are considered part of this domain. For inputs and outputs of the top-level design, specify ports. For inputs and outputs of instances of a timing model in the library, specify a list of the instance pins that are part of the domain. If this option is not specified with the -instances option, the power domain is considered to be a virtual power domain. A virtual domain allows to describe the associations of the inputs and outputs of an IP instance with power domains.
-default: Identifies the specified domain as the default power domain. All instances of the design that were not associated with a specific power domain belong to the default power domain.
-instances instance_list: Specifies the names of all instances that belong to the specified power domain. If this option is specified together with the -boundary_ports option, it indicates that for any connection between a specified port and any instance inside the power domain, no special interface logic for power management is required.
-name power_domain: Specifies the name of a power domain.
-shutoff_condition expression: Specifies the condition when a power domain is shut off. The condition is a boolean function of pins. If this option is omitted, the power domain is considered to be always on.

The create_power_domain command creates a power domain and specifies the instances and top-level ports that belong to this power domain. By default, an instance inherits the power domain setting from its parent hierarchical instance or design, unless that instance is associated with a specific power domain. In CPF, power domains are associated with the design objects based on the logical hierarchy. The order in which a designer creates the power domains is irrelevant. Note that a designer can define at least two power domains for a design, and only one power domain can be the default power domain. In addition, the create_power_domain command specifies the -power_switchable_nets and -ground_switchable_nets options if the designer wants to use the CPF file as a golden constraint file throughout the entire flow from design creation until design implementation and signoff. An example use of the create_power_domain command is shown below.

```
create_power_domain
    -name power_domain
    { -default [-instances instance_list]
    | -instances instance_list [-boundary_ports pin_list]
    | -boundary_ports pin_list }
    [ -power_switchable_nets net_list | -ground_switchable_nets net_list]
    [ -shutoff_condition expression]
```

The options and their corresponding arguments of the create_power_domain command are as follows according to an embodiment of the present invention.
-boundary_ports pin_list: This option and its argument specify the list inputs and outputs that are considered part of this domain. Specifically, for inputs and outputs of the top-level design, it specifies ports. For inputs and outputs of instances of a timing model in the library, it specifies a list of the instance pins that are part of the domain. If this option is not specified with the -instances option, the power domain is considered to be a virtual power domain. A virtual domain allows a designer to describe the associations of the inputs and outputs of an existing instance block or a not-yet designed instance block with power domains.
-default: This option identifies the specified domain as the default power domain. All instances of the design that are not associated with a specific power domain belong to the default power domain. This is also the power domain that is referenced when information for calculating delays of a specific condition of a design is created.
-ground_switchable_nets net_list: This option and its argument identify the ground nets that connect the GROUND pins of the gates and the switch that controls the power shut-off. The specified nets will be considered as global ground nets. A designer may specify this option when the path from power to ground is cut off on the ground side (i.e., use a footer cell).
-instances instance_list: This option and its argument specify the names of all instances that belong to the specified power domain. If this option is specified together with the -io_ports option, it indicates that for any connection between a specified port and any instance inside the power domain, no special interface logic for power management is required.
-name power_domain: This option and its argument specify a name of a power domain.
-power_switchable_nets net_list: This option and its argument identify the power nets that connect the POWER pins of the gates and the switch that controls the power shut-off. The specified nets are considered as global power nets. A designer may specify this option when the path from power to ground is cut off on the power side (i.e., use a header cell).
-shutoff_condition expression: This option and its argument specify a condition when a power domain is shut off. The condition is a Boolean function of the pins. In the default mode, the power domain is on.

The example below illustrates the uses of the create_power_domain command. It assumes a design with the hierarchy Top→INST1→INST2. In this example, the following two sets of CPF commands are equivalent:

```
a.   create_power_domain -name PD1 -instances INST1
     create_power_domain -name PD2 -instances INST1.INST2
```

-continued

```
b.  create_power_domain -name PD2 -instances INST1.INST2
    create_power_domain -name PD1 -instances INST1
```

This illustrates that the order in which the designer specifies the target domains is irrelevant. The result is that instance INST1 belongs to power domain PD1 and instance INST2 belongs to power domain PD2. The following command associates a list of instances with power domain PD2.

create_power_domain -name PD2 -instances {A C I_ARM1 PAD1}

The create_state_retention_logic command is used to replace selected registers or all registers in the specified power domain with state retention flip_flops. By default, the appropriate state retention cells are chosen from the state retention cells defined with the define_state_retention_cell command or from the library based on the appropriate .lib attributes. An example use of the create_state_retention_logic command is shown below.

```
create_state_retention_logic
    { -power_domain power_domain | -instances instance_list }
    -restore_edge expression [ -save_edge expression ]
    [ -clock_gating_condition expression ]
    [ -cell_type string ]
```

The options and their corresponding arguments of the create_state_retention_logic command are shown as follows according to an embodiment of the present invention.

-cell_type string: This option and its argument specify the class of library cells that can be used to map designer-specified sequential elements such as flip-flops and latches. The specified string corresponds to the value of a power_gating_cell .lib attribute. If this option is not specified, the tool may automatically choose the state retention flip-flops from the library.

-clock_gating_condition expression: This option and its argument specify a condition when the clock of a state retention cell is gated so that the save or restore operation can be carried out. The condition is a function of the pins. Note that some technologies require the clock signal being stable before a save or restore operation can be carried out.

-instances instance_list: This option and its argument specify the names of the latches and flip_flops that a designer wants to replace with a state retention flip-flop. A designer may specify the names of the leaf instances. If the designer specifies the name of a hierarchical instance, all latches and flip-flops in this instance and its children that belong to the same power domain will be replaced. Note that the instances may belong to several power domains. If they belong to different power domains, the same conditions will be applied.

-power_domain power_domain: This option and its argument specify a name of a power domain containing the target flip_flops to be replaced. In this case, all flip-flops in this power domain are replaced. The power domain is previously defined with the create_power_domain command.

-restore_edge expression: This option and its argument specify a condition when the states of the sequential elements need to be restored. The expression is a function of pins. When the expression changes from false to true, the states are restored. During logical synthesis, the logic implementing the expression will be used to drive the restore pin of the state retention cells.

-save_edge expression: This option and its argument specify a condition when the states of the sequential elements need to be saved. The condition is a function of pins. When the expression changes from false to true, the states are saved. During logical synthesis, the logic implementing the expression will be used to drive the save pin of the state retention cells. The inverse of this option is the restore_edge option.

The set_array_naming_style command specifies a format for naming individual bits of instance arrays. Note that this command appears once in a CPF file. Also note that this command is not needed if the designer uses the same object names in CPF as in the design. This command is optional in a CPF file used by RTL compiler. If the designer wants to include the command in the CPF file used by RTL compiler, the specified string needs to match the value of the hdl_array_naming_style root attribute set in RTL compiler. If the CPF file is generated by RTL compiler, the string in this command will match the value of the hdl_array_naming_style root attribute in RTL compiler. An example use of the set_array_naming_style command is shown below. The String specifies the format for an individual bit of an instance array.

set_array_naming_style string

The set_hierarchy_separator command specifies the hierarchy delimiter character used in the CPF file. Note that this command appears once in the CPF file. The Character argument specifies the hierarchy delimiter character. An example use of the set_hierarchy_separator command is shown below.

set_hierarchy_separator character

The set_cpf_version command specifies the version of the format. The value argument specifies the version by using a string. An example use of the set_cpf_version command is shown below.

set_cpf_version 1.0

The set_register_naming_style command specifies the format used to print out flip-flops and latches in the netlist. Note that this command appears once in a CPF file. Also note that this command is not needed if the same object names in CPF as in the design are used. This command is optional in a CPF file used by RTL compiler. If a designer wants to include the command in the CPF file used by RTL compiler, he needs to ensure that the specified string matches the value of the hdl_reg_naming_style root attribute set in RTL compiler. If the CPF file is generated by RTL compiler, the string in this command will match the value of the hdl_reg_naming_style root attribute in RTL compiler. An example use of the set_register_naming_style is shown below. The string argument specifies the format used for flip_flops and latches in the netlist.

set_register_naming_style string

The set_scope command changes the current scope to the scope determined by the argument. Note that all objects referred to in the library cell-related CPF commands are scope insensitive, all design objects except for ground and power nets are scope sensitive, and all the expressions in the CPF design-related constraints are scope sensitive. An example use of the set_scope command is shown below.

set_scope {hier_instance [-merge_default_domains]| -top | -up}

The options and their corresponding arguments of the set_scope command are shown as follows according to an embodiment of the present invention.

-top: This option changes the scope top the top design. Note that when a hierarchical CPF file is used, the designer should avoid using this argument in a sourced CPF file. In this case, the command does not reset the scope to the scope of the module of the hierarchical instance to which the sourced CPF file applies, but to the design of the main CPF file.

-up: This option changes the scope to the immediate parent of the current scope. Note that if a designer uses this argument when the current scope is already the top design, an error message may be issued.

-hier_instance: This option changes the scope to the specified hierarchical instance. The instance is a valid hierarchical instance in the current scope.

-merge_default_domains: This option specifies whether to merge the default power domain of the current scope (when it is not the top design) with the default power domain of the top design. Note that this option may be specified in the context of hierarchical CPF.

The following example further illustrates the use of the set_scope command.

```
set_top_design A
set_scope B.C ; #changes.the scope to B.C
create_isolation_logic -isolation_condition. enable -from PD1
# the previous command ues the enable signal at the top
level to create isolation
    # logic at the output ports of power domain PD1
    set_scope -up ; #changes the scope to B
    set_scope -up ; #changes the scope to the parent of B, which is A or
the top
```

The set_top_design command specifies the name of the design to which the power information in the CPF file applies. Note that this command usually appears once in a CPF file. If it appears multiple times, the first one applies to the top design, while the subsequent ones follow a scope change using the set_scope command. An example use of the set_top_design command is shown below.

set_top_design design

The argument design specifies the name of the design to which the power information in the CPF file applies. It specifies the name of the top module in RTL. Note that when a designer uses a hierarchical CPF file, the design name corresponds to the module name of the current scope.

The following example further illustrates the use of the set_top_design command. In this case, the commands of the CPF file of the soft block are copied directly into the CPF file of the top design. Design B corresponds to the module name of instance i_B, which is the current scope.

```
set_top_design top_chip
create_power_domain -name PD1 -instances C
create_power_domain -name Default -default
set_scope i_B
set_top_design B
create_power_domain -name Standby -instances
DRAM -io_ports {P1 P2} \
-shutoff_condition power_down
set_scope -top
create_isolation_logic-fromi_B.Standby-toPD1-
isolation_conditionstdby_signal
```

The create_power_switch_rule specifies how a single power switch must connect the external and internal power or ground nets for the specified power domain during implementation. One can specify one or more commands for a power domain depending on whether one wants to control the switchable power domain by a single switch or multiple switches.

```
create_power_switch_rule
    -name string
    -domain power_domain
    {-external_power_net net | -external_ground_net net}
    -enable_condition expression [-acknowledge_receiver pin]
    [-cells cell_list] [-prefix string]
```

-acknowledge_receiver pin: Specifies an input pin in the design which must be connected to an output pin of the power switch cell.

-cells cell_list: Specifies the name of the library cells that can be used as power switch cells. A power switch cell must have been defined with the define_power_switch_cell command.

-domain power_domain: Specifies the name of a power domain. The power domain must have been previously defined with the create_power_domain command.

-enable_condition expression: Specifies the condition when the power switch should be enabled. The condition is a Boolean expression of one or more pins. Note: If the specified power domain has a shutoff condition, the support set of this expression must be a subset of the support set of the shut-off condition.

-external_ground_net net: Specifies the external ground net to which the source pin of the power switch must be connected. The drain pin must be connected to the internal ground net associated with the specified power domain. One can only specify this option when you use a footer cell. If the external ground net is not part of the design, you must first declare this net using the create_ground_nets command. Note: A net specified as an external ground net in one domain can be specified as an internal ground net of another domain using the -internal_ground_net option of the update_power_domain command.

-external_power_net net: specifies the external power net to which the source pin of the power switch must be connected. The drain pin must be connected to the internal power net associated with the specified power domain. One can only specify this option when you use a header cell. If the external power net is not part of the design, you must first declare this net using the create_power_nets command. Note: A net specified as an external power net in one domain can be specified as an internal power net of another domain using the -internal_power_net option of the update_power_domain command.

-name string: Specifies the name of the power switch rule. Note: The specified string cannot contain wildcards.

-prefix string: Specifies the prefix to be used when creating this logic. Default: CPF_PS_.

For applications that read .lib files, the define_always_on_cell command Identifies the library cells in the .lib files that can be used as cells that are always on. For applications that do not read library files the define_always_on_cell command allows to identify the instances of these cells in the netlist.

```
define_always_on_cell
    -cells cell_list [-library_set library_set]
    [ [-power_switchable LEF_power_pin | -ground_switchable
    LEF_ground_pin]
            -power LEF_power_pin -ground LEF_ground_pin ]
```

-cells cell_list: Identifies the specified cells as special cells that are always on.

-ground LEF_ground_pin: If this option is specified with the -power_switchable option, it indicates the GROUND pin of the specified cell.

If this option is specified with the -ground_switchable option, it indicates the GROUND pin in the corresponding LEF cell to which the ground that is on during power shut-off mode is applied.

-ground_switchable LEF_power_pin: Identifies the GROUND pin in the corresponding LEF cell to which the ground that is switched off during power shut-off mode is applied.

One can only specify this option when you cut off the path from power to ground on the ground side (that is, use a footer cell).

-library_set library_set: References the library set to be used to search for the specified cells. Specify the library set name.

The libraries must have been previously defined in a define_library_set command.

-power LEF_power_pin: If this option is specified with the -ground_switchable option, it indicates the POWER pin of the specified cell.

If this option is specified with the -power_switchable option, it indicates the POWER pin in the corresponding LEF cell to which the power that is on during power shut-off mode is applied.

-power_switchable LEF_power_pin: Identifies the POWER pin in the corresponding LEF cell to which the power that is switched off during power shut-off mode is applied.

One can only specify this option when you cut off the path from power to ground on the power side (that is, use a header cell).

For applications that read .lib files define_isolation_cell identifies the library cells in the .lib files that can be used as isolation cells. Note: If the library contains cells that have the attribute is_isolation_cell set to true, an application might use these cells before it uses the cells identified with an define_isolation_cell command. For applications that do not read library files define_isolation_cell allows to identify the instances of isolation cells in the netlist.

```
define_isolation_cell
    -cells cell_list [-library_set library_set]
    [-always_on_pin pin_list]
    [ {-power_switchable LEF_power_pin | -ground_switchable
    LEF_ground_pin}
        -power LEF_power_pin -ground LEF_ground_pin ]
    [-valid_location { from | to}]
    [-non_dedicated]
    -enable pin
```

-always_on_pins pin_list: Specifies a list of cell pins which must always be driven.

Note: A pin specified with this option, can be specified with other options as well.

-cells cell_list: Identifies the specified cells as isolation cells.

Note: This is equivalent to setting the attribute is_isolation_cell to true in the Liberty library.

The libraries loaded will be searched and all cells found will be identified.

-enable pin: Identifies the specified cell pin as the enable pin.

-ground LEF_ground_pin: If this option is specified with the -power_switchable option, it indicates the GROUND pin of the specified cell.

If this option is specified with the -ground_switchable option, it indicates the GROUND pin in the corresponding LEF cell to which the ground that is on during power shut-off mode is applied.

-ground_switchable LEF_power_pin: Identifies the GROUND pin in the corresponding LEF cell to which the ground that is turned off during power shut-off mode is applied.

One can only specify this option when you cut off the path from power to ground on the ground side (that is, use a footer cell).

-library_set library_set: References the library set to be used to search for the specified cells. Specify the library set name.

The libraries must have been previously defined in a define_library_set command.

-non_dedicated: Allows to use specified cells as normal function cells.

-power LEF_power_pin: If this option is specified with the -ground_switchable option, it indicates the POWER pin of the specified cell.

If this option is specified with the -power_switchable option, it indicates the POWER pin in the corresponding LEF cell to which the power that is on during power shut-off mode is applied.

-power_switchable LEF_power_pin: Identifies the POWER pin in the corresponding LEF cell to which the power that is turned off during power shut-off mode is applied.

One can only specify this option when you cut off the path from power to ground on the power side (that is, use a header cell).

-valid_location {from | to}: Specifies the location of the isolation cell.

Possible values are from—indicating that the cell must be stored with the source power domain to—indicating that the cell must be stored with the destination power domain.

For applications that read .lib files define_level_shifter_cell identifies the library cells in the .lib files that can be used as level shifter cells. Note: if the library contains cells that have the attribute is_level_shifter set to true, an application might use these cells before it uses the cells identified with an define_level_shifter_cell command. For applications that do not read library files define_level_shifter_cell allows to identify the instances of level shifter cells in the netlist.

```
define_level_shifter_cell
    -cells cell_list [-library_set library_set]
    [-always_on_pin pin_list]
    -input_voltage_range {voltage | voltage_range}
    -output_voltage_range {voltage | voltage_range}
    [-direction {up|down|bidir}]
    [-output_voltage_input_pin pin]
    { -input_power_pin LEF_power_pin [-output_power_pin
    LEF_power_pin]
    | [-input_power_pin LEF_power_pin] -output_power_pin
    LEF_power_pin }
    -ground LEF_ground_pin
    [-valid_location { from | to}
```

-always_on_pins pin_list: Specifies a list of cell pins which must always be driven.

Note: A pin specified with this option, can be specified with other options as well.

-cells cell_list: Identifies the specified cell as a level shifter.

Note: This is equivalent to setting the attribute is_level_shifter to true in the Liberty library.

The libraries loaded will be searched and all cells found will be used.

-direction {up | down | bidir}: Specifies whether the level shifter can be used between a lower and higher voltage, or vice versa.

Default: up

-ground LEF_ground_pin: Identifies the name of the GROUND pin in the corresponding LEF cell.

-input_power_pin LEF_power_pin: Identifies the name of the POWER pin in the corresponding LEF cell that must be connected to the power net to which the voltage of the source power domain is applied.

-input_voltage_range {voltage | voltage_range}: Identifies either a single input voltage or a range for the input (source) voltage that can be handled by this level shifter.

The voltage range must be specified as follows:

lower_bound:upper_bound:step: Specify the lower bound, upper bound and voltage increment step, respectively.

-library_set library_set: References the library set to be used to search for the specified cells. Specify the library set name.

The libraries must have been previously defined in a define_library_set command.

-output_power_pin LEF_power_pin: Identifies the name of the POWER pin in the corresponding LEF cell that must be connected to the power net to which the voltage of the destination power domain is applied.

-output_voltage_input_pin pin: Identifies the input pin that drives a gate inside the level shifter cell that is powered by the power supply connected to the pin identified by the -output_power_pin option.

By default, the gates (inside the level shifter cell) driven by the input pins, are assumed to be powered by the power supply connected to the pin identified by the -input_power_pin option.

Note: If the cell is also listed in the define_isolation_cell command, this pin is the enable pin of the isolation cell.

-output_voltage_range {voltage | voltage_range}: Identifies either a single output voltage or a range for the output (source) voltage that can be handled by this level shifter.

The voltage range must be specified as follows:
lower_bound:upper_bound:step

Specify the lower bound, upper bound and voltage increment step, respectively.

-valid_location {from | to}: Specifies the location of the level shifter cell. Possible values are:

from—indicating that the cell must be stored with the source power domain;

to—indicating that the cell must be stored with the destination power domain.

Default: to

For applications that read .lib files define_power_switch_cell identifies the library cells in the .lib files that can be used as power switch cells. For applications that do not read library files define_power_switch_cell allows to identify the instances of power switch cells in the netlist. Note: This command is required if you use the create_power_switch_logic command.

```
define_power_switch_cell
    -cells cell_list [-library_set library_set]
    -stage_1_enable expression [-stage_1_output expression]
    [-stage_2_enable expression [-stage_2_output expression]]
    -type {footer|header}
    [ -power_switchable LEF_power_pin -power LEF_power_pin
    | -ground_switchable LEF_ground_pin -ground LEF_ground_pin ]
    [ -on_resistance float]
    [ -stage_1_saturation_current float] [ -stage_2_saturation_current
      float]
    [ -leakage_current float ]
```

-cells cell_list: Identifies the specified cells as power switch cells.

-ground LEF_ground_pin: Identifies the input ground pin of the corresponding LEF cell.

One can only specify this option when you cut off the path from power to ground on the ground side (that is, use a footer cell).

-ground_switchable LEF_ground_pin: Identifies the output ground pin in the corresponding LEF cell that must be connected to a switchable ground net.

-leakage_current float: Specifies the leakage current when the power switch is turned off. Specify the current in ampere (A).

-library_set library_set: References the library set to be used to search for the specified cells. Specify the library set name.

The libraries must have been previously defined in a define_library_set command.

-on_resistance float: Specifies the resistance of the power switch when the power switch is turned on. Specify the resistance in ohm.

-power LEF_power_pin: Identifies the input POWER pin of the corresponding LEF cell.

You can only specify this option when you cut off the path from power to ground on the power side (that is, use a header cell).

-power_switchable LEF_power_pin: Identifies the output power pin in the corresponding LEF cell that must be connected to a switchable power net.

One can only specify this option when you cut off the path from power to ground on the power side (that is, use a header cell).

-stage_1_saturation_current (-stage_2_saturation_current) float: Specifies the Id saturation current of the MOS transistor in the specified stage. Specify the current in ampere (A).

The saturation current—which can be found in the SPICE model—limits the maximum current that a power switch can support.

-stage_1_enable (-stage_2_enable) expression: Specifies when the transistor driven by this input pin is turned on (enabled) or off.

The switch is turned on when the expression evaluates to true. The expression is a function of the input pin.

-stage_1_output (-stage_2_output) expression: Specifies whether the output pin specified in the expression is the buffered or inverted output of the input pin specified through the corresponding -stage_x_enable option.

The pin specified through the -acknowledge_receiver option of the create_power_switch_rule command is connected to the output pin specified through:

The -stage_1_output option if the -stage_2_output option is omitted;

The -stage_2_output option if both -stage_1_output and stage_2_output options are specified.

Note: If neither option is specified, the pin specified through the -acknowledge_receiver is left unconnected.
-type {header|footer}: Specifies whether the power switch cell is a header or footer cell.

For applications that read .lib files define_state_retention_cell identifies the library cells in the .lib files that can be used as state retention cells. Note: If the library contains cells that have the attribute power_gating_cell set to true, an application might use these cells before it uses the cells identified with an define_state_retention_cell command. For applications that do not read library files define_state_retention_cell allows to identify the instances of state retention cells in the netlist. Note: This command is required for any application that does not read .lib files.

```
define_state_retention_cell
    -cells cell_list [-library_set library_set]
    [-always_on_pin pin_list]
    [-clock_pin pin]
    -restore_function expression [-restore_check expression]
    [-save_function expression] [-save_check expression]
    [ {-power_switchable LEF_power_pin | -ground_switchable
    LEF_ground_pin}
        -power LEF_power_pin -ground LEF_ground_pin ]
```

-always_on_pins pin_list: Specifies a list of cell pins which must always be driven.

Note: A pin specified with this option, can be specified with other options as well.
-cells cell_list: Identifies the specified cells as state retention cells.

Note: This is equivalent to setting the attribute power_gating_cell to true in the Liberty library.

The libraries loaded will be searched and all cells found will be used.
-clock_pin pin: Specifies the clock pin.
-ground LEF_ground_pin: If this option is specified with the -power_switchable option, it specifies the GROUND pin of the corresponding LEF cell.

If this option is specified with the -ground_switchable option, it indicates the GROUND pin in the corresponding LEF cell to which the ground net that is on during power shut-off mode is connected.
-ground_switchable LEF_power_pin: Identifies the GROUND pin in the corresponding LEF cell to which the ground that is turned off during power shut-off mode is applied.

One can only specify this option when you cut off the path from power to ground on the ground side (that is, use a footer cell).
-library_set library_set: References the library set to be used to search for the specified cells. Specify the library set name.

The libraries must have been previously defined in a define_library_set command.
-power LEF_power_pin: If this option is specified with the -ground_switchable option, it indicates the POWER pin of the specified cell.

If this option is specified with the -power_switchable option, it indicates the POWER pin to which the power that is always on during shut-off mode is applied.
-power_switchable LEF_power_pin: Identifies the POWER pin in the corresponding LEF cell to which the power that is turned off during power shut-off mode is applied.

One can only specify this option when you cut off the path from power to ground on the power side (that is, use a header cell).
-restore_check expression: Specifies the additional condition when the states of the sequential elements can be restored. The expression can be a function of the clock pin and the restore pin. The expression must be true when the restore event occurs.

Note: If one wants to use the clock pin in the expression, you must have identified the clock pin with the -clock_pin option.
-restore_function expression: Specifies the polarity of the restore pin that enables the retention cell to restore the saved value after exiting power shut-off mode.

Note: Expression is limited to the pin name and the inversion of the pin name. An expression containing only the pin name indicates an active high polarity. An expression containing the inversion of the pin name indicates an active low polarity.
-save_check expression: Specifies the additional condition when the states of the sequential elements can be saved. The expression can be a function of the clock pin and the save pin The expression must be true when the save event occurs.

Note: If one wants to use the clock pin in the expression, you must have identified the clock pin with the -clock_pin option.
-save_function expression: Specifies the polarity of the save pin that enables the retention cell to save the current value before entering power shut-off mode.

If not specified, the save event is triggered by the opposite of the expression specified for the restore event.

Note: Expression is limited to the pin name and the inversion of the pin name. An expression containing only the pin name indicates an active high polarity. An expression containing the inversion of the pin name indicates an active low polarity.

In conclusion, what has been described is an improved method, system, and article of manufacture for implementing an integrated circuit. Some embodiments provide a methodology and structure to handle designs having special power requirements, such as low power designs. The single file format approach of some embodiments may be accessed and used by EDA tools throughout the EDA design flow to implement the integrated circuit design.

Figure 10:
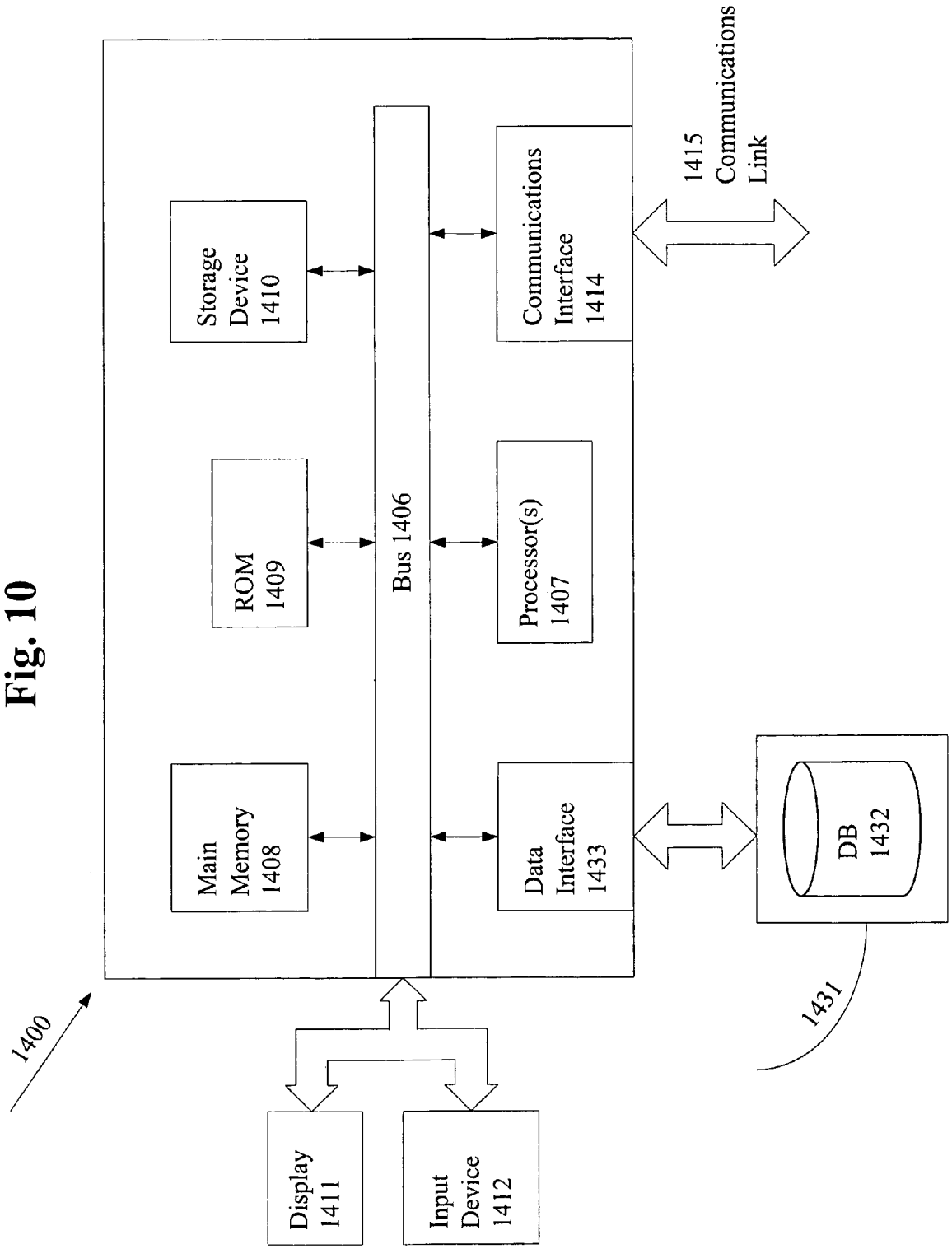
FIG. 10 illustrates an example computing architecture with which embodiments of the invention may be practiced.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of adding power control circuitry to an RTL circuit design comprising:
    using a computer to demarcate multiple power domains within the circuit design;
    wherein demarcating respective power domains includes designating design object instances within the circuit design encompassed within respective power domains;
    specifying multiple power modes each power mode corresponding to a different combination of on/off states of the multiple demarcated power domains; and
    defining isolation behavior relative to respective power domains.

2. The method of claim 1,
    wherein demarcating respective power domains includes designating design object instances within the circuit design encompassed within respective power domains; and
    wherein at least one power domain encompasses at least one other power domain.

3. The method of claim 1, wherein demarcating a respective power domain includes identifying a ground net that connects with a switch that controls shut off of the respective power domain.

4. The method of claim 1, wherein demarcating a respective power domain includes identifying a power net that connects with a switch that controls shut off the respective power domain.

5. The method of claim 1, wherein demarcating a respective power domain includes setting forth a respective expression representing a condition upon which the respective demarcated power domain is to be shut off.

6. The method of claim 1 further including designating a sequencing of the power modes.

7. The method of claim 1, wherein defining isolation behavior includes designating whether isolation behavior is to apply to input pins of a respective power domain.

8. The method of claim 1, wherein defining isolation behavior includes designating whether isolation behavior is to apply to output pins of a respective power domain.

9. The method of claim 1, wherein defining isolation behavior includes designating values of respective pins of a respective power domain during an isolation state while the respective power domain is turned off.

10. The method of claim 1,
    wherein defining isolation behavior includes designating values of respective pins of a respective power domain during an isolation state while the respective power domain is turned off; and
    wherein the output value is one of high, low or at a level equal to its level prior to activation of the isolation state.

11. The method of claim 1 further including designating the power domain in which logic to implement the isolation behavior.

12. The method of claim 1,
    wherein defining isolation behavior relative to respective power domains includes defining isolation behavior between a first demarcated power domain and a second demarcated power domain; and further including:
    designating whether to implement isolation behavior logic in the first demarcated power domain or in the second demarcated power domain.

13. The method of claim 1 further including designating state retention behavior during shut off of at least one demarcated power domain.

14. The method of claim 1 further including:
    designating state retention behavior during shut off of at least one demarcated power domain;
    wherein designating state retention behavior includes designating at least one class of library cells eligible to implement state retention logic.

15. The method of claim 1 further including:
designating state retention behavior during shut off of at least one demarcated power domain;
wherein designating state retention behavior includes designating a power domain in which to replace a storage cell with state retention logic to implement state retention behavior during shut off of at least one demarcated power domain.

16. The method of claim 1 further including:
designating state retention behavior during shut off of at least one demarcated power domain;
wherein designating state retention behavior includes setting forth an expression to representing a condition upon which to store a state to be retained during shut off of the at least one demarcated power domain.

17. The method of claim 1 further including:
designating state retention behavior during shut off of at least one demarcated power domain;
wherein designating state retention behavior includes setting forth an expression to representing a condition upon which to restore a state retained during shut off of the at least one demarcated power domain.

18. The method of claim 1 further including designating level shifting behavior between a first demarcated power domain and a second demarcated power domain.

19. An article of manufacture that includes a computer data storage device, encoded with code structure, when executed by a computer causes the computer data storage device, to implement a method comprising:
using a computer to instruct a circuit design process to include power control behavior in a circuit design at each of an RTL and a netlist level, the behavior including:
multiple power domains demarcated by design objects of the circuit design; and
multiple power modes each power mode including a different combination of on/off states of the multiple demarcated power domains.

20. The article of manufacture of claim 19 said method further include a step of setting forth a respective expression representing a condition upon which the respective demarcated power domain is to be shut off.

21. The article of manufacture of claim 19 further including code defining isolation behavior relative to respective power domains.

22. The article of manufacture of claim 19 said method further include a step of designating a sequencing of the power modes.

23. The article of manufacture of claim 19 said method further include a step of designating state retention behavior during shut off of at least one demarcated power domain.

24. The article of manufacture of claim 19 said method further include a step of designating level shifting behavior between a first demarcated power domain and a second demarcated power domain.

25. A method of designing power control circuitry for an RTL circuit design comprising:
using a computer to produce a power specification encoded in computer readable medium that specifies:
multiple power domains demarcated by design objects of the circuit designs, and
multiple power modes each power mode including a different combination of on/off states of the multiple demarcated power domains;
using the power specification to simulate power-related behavior of an RTL version of the circuit design; and
using the power specification to place power-related cells of a netlist version of the circuit design.

26. A method of designing power control circuitry for an integrated circuit design at each of an RTL and a netlist level comprising:
using a computer to produce a power specification encoded in computer readable medium that specifies:
multiple power domains demarcated by design objects of the RTL circuit design, and
multiple power modes each power mode including a different combination of on/off states of the multiple demarcated power domains;
using the power specification to synthesize power-related logic of the circuit design; and
using the power specification to place power-related cells of a netlist version of the circuit design.

27. The method of claim 26 further including using the power specification to simulate power-related behavior of an RTL version of the circuit design.

28. A method of designing power control circuitry for an integrated circuit design at each of an RTL and a netlist level comprising:
using a computer to produce a power specification encoded in computer readable medium that specifies:
multiple power domains demarcated by design objects of the RTL circuit design, and
multiple power modes each power mode including a different combination of on/off states of the multiple demarcated power domains;
using the power specification to place power-related cells of a netlist version of the circuit design; and
using the power specification to generate test signal patterns to test operation of the circuit design.

29. The method of claim 28 further including:
using the power specification to simulate power-related behavior of an RTL version of the circuit design; and
using the power specification to synthesize power-related logic of the circuit design.

* * * * *

UNITED STATES PATENT AND TRADEMARK OFFICE
CERTIFICATE OF CORRECTION

| | | |
|---|---|---|
| PATENT NO. | : 7,739,629 B2 | Page 1 of 1 |
| APPLICATION NO. | : 11/590657 | |
| DATED | : June 15, 2010 | |
| INVENTOR(S) | : Qi Wang et al. | |

It is certified that error appears in the above-identified patent and that said Letters Patent is hereby corrected as shown below:

In column 3, line 9, delete "the" and insert -- The --, therefor.

In column 7, line 55, delete "the a" and insert -- the --, therefor.

In column 11, line 29, delete "a" and insert -- an --, therefor.

In column 13, line 37, delete "value," and insert -- value --, therefor.

In column 13, line 44, delete "to" and insert -- to. --, therefor.

In column 18, line 64, delete "top" and insert -- to --, therefor.

In column 19, line 22, delete "changes.the" and insert -- changes the --, therefor.

In column 19, line 24, delete "ues" and insert -- use --, therefor.

In column 21, line 41, delete "an" and insert -- a --, therefor.

In column 22, line 49, delete "an" and insert -- a --, therefor.

In column 25, line 21, delete "an" and insert -- a --, therefor.

In column 26, line 35, delete "pin The" and insert -- pin. The --, therefor.

In column 30, line 10, in Claim 25, delete "designs," and insert -- design, --, therefor.

Signed and Sealed this

Fourteenth Day of September, 2010

David J. Kappos
*Director of the United States Patent and Trademark Office*